Patented Nov. 10, 1925.

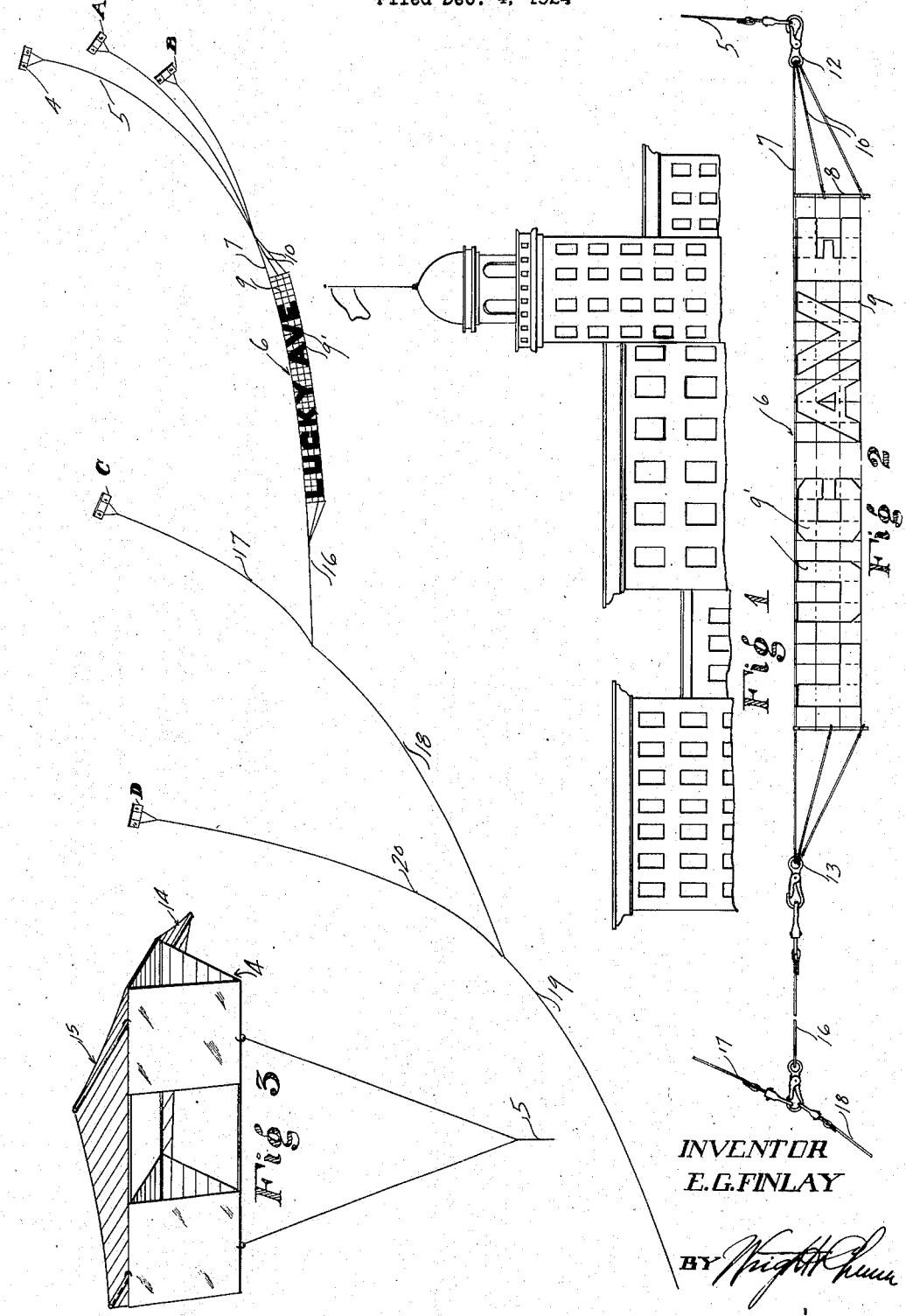

1,560,906

UNITED STATES PATENT OFFICE.

EDGAR G. FINLAY, OF LOS ANGELES, CALIFORNIA.

METHOD OF AND APPARATUS FOR AERIAL ADVERTISING.

Application filed December 4, 1924. Serial No. 753,838.

*To all whom it may concern:*

Be it known that I, EDGAR G. FINLAY, a subject of Great Britain, residing at 5108 Cimarron St., Los Angeles, in the county of Los Angeles and State of California, have invented new and useful Improvements in Methods of and Apparatus for Aerial Advertising, of which the following is a specification.

The present invention relates to an improved method of and apparatus for suspending and conspicuously displaying advertising matter at a considerable elevation from the ground, through the use of a novel construction and arrangement of kites or like devices.

One of the purposes of the invention is to provide a simple, comparatively inexpensive and reliable apparatus for conveniently hoisting and maintaining advertising matter at an elevation where the advertising matter will be effectively displayed, the apparatus being such that the operator may bring about the aerial display while stationed on the ground or top of a building and anchor and easily maintain the advertising matter in a desirable position under varying weather conditions.

Heretofore in aerial advertising one of the difficulties encountered has been the unreliability or lack of stability in the apparatus to maintain the advertising matter in such position as to be effectively displayed under varying weather conditions. The present invention includes a special construction and arrangement of kites and rigging, together with an especially constructed advertising display device which is associated in accordance with the invention with the specially constructed apparatus, and the manipulation of the apparatus may be easily effected by a single operator.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 shows the apparatus of the invention as it would appear when in use and as displaying an advertising sign above comparatively high buildings.

Fig. 2 represents an enlarged front elevation of the advertising sign or display forming a part of the invention.

Fig. 3 represents a perspective view of one of the kites.

In carrying out the invention a kite, preferably one having considerable lifting power of the type shown in the drawing, and designated 4, is raised, using the ordinary methods of flying kites, the operator standing on the ground or top of some building or other eminence. When the kite has reached the proper height or elevation such that it will have the desired lifting power, the line 5 leading from the kite may be attached by the operator to one end of the aerial advertising display or sign 6. This device comprises a cable or like flexible cord 7, from points spaced from the ends of which rigid arms or bars 8 depend. These arms or bars 8 have a long net 9 of cord, stretched between them, the net being similar to the ordinary tennis net. The upper edge of the net is attached to the line 7. Suitably fastened onto the net are preferably cloth letters 9'. The cloth used is preferably light but tough and strong so that it will not be subject to being readily torn by the wind. Any other advertising display other than letters, not shown, of course may be used and will be made of cloth and attached in the same manner to the net.

Holding the bars 8 in position are flexible guy lines 10 and 11 which are attached to snap hooks 12 and 13 to which the ends of the line 7 are fastened. Thus the sign or display device 6 is set up so that the hook at one end, for example, the one 12 is attached to the line 5 of the kite. The line 7 will extend as though a continuation of the kite line 5. In practice this line 7 is comparatively long as the sign must of necessity be comparatively large. For example, the line will be one hundred to two hundred feet long. If the wind is strong and the kite has sufficient lifting force, a single kite may be employed to lift one end of the sign, the operator holding onto the other end of the sign the same as he would in holding onto the kite line. If the kite does not have sufficient lifting force, due to the wind conditions or to the size of the kite, as the same may be, other kites as shown in Fig. 1, designated A and B, are flown and their lines are attached to the hook 12 of the sign or display device 6. The second kite is flown so that it will not interfere with the first kite and if, as shown in Fig. 1, the third kite, designated B, is to be used, it is flown so that it will not interfere with the other kites. The kites are constructed so that by changing the angle or construction of the wings 14 and 15 or possibly due to changing the body construction of the kite, they will fly so that they will not interfere with one another although the lines are attached to the same point. Preferably the length of the line from each kite to the ring of the sign, differs so that this further prevents any interference of the kites with one another, the changing of the lengths of the lines causing the kites to fly to different elevations. The kite or kites, as the case may be, are let out further and the operator holding onto the lowermost end of the sign, then attaches a line 16 to the hook 13 and pays out this line until the end is reached after which the line is secured or anchored in any suitable manner. The line 16 is one hundred feet or more in length. Another kite C, is flown and when this kite reaches the proper elevation, the operator hooks the cord or line 17 of the kite C onto the end of the line 16. Another line 18 is attached to the ends of the lines 16 and 17 and the operator further pays out the line 18 until all of the kites are let out. The second kite will act to raise the other end of the sign so that it is displayed in substantially horizontal position and is clearly readable from the ground. After the kites are raised as shown in Fig. 1, the line 18 may be fastened in any suitable manner, not shown, and the kites will maintain the sign in the position shown so as to effectively display it.

I may use another kite D, as shown in Fig. 1, which kite is flown in order to prevent objectionable or dangerous sagging of the control line leading from the operator to the apparatus. All of the lines are preferably made in lengths, at the ends of which are snap hooks, not shown, such as the snap hooks 12 and 13 and if it is desired to further lift the apparatus, another line such as the one 19 is snapped onto the end of the line 18. With a long control line thus composed of two sections namely, the sections 18 and 19, the line is apt to sag to an objectionable and dangerous extent. In this instance the kite D is flown and the end of the line 20 of said kite is joined to the ends of the lines 18 and 19, in this instance the three snap hooks being joined one to the other. The snap hooks are not shown in Fig. 1 but their use and manner of connection is obvious as the said hooks are the same as those, 12 and 13, shown in Fig. 2. To attach the kite line 20, the lines 18 and 19 may be hauled in to bring the juncture of said lines to the operator so that said line 20 may be attached at said juncture. At any rate this kite D will serve as a support for the long control line composed of the sections 18 and 19 to prevent its sagging to the extent that it would possibly touch a tree or tall building adjacent to which it may extend. This kite will also assist in supporting the display apparatus as a whole. If desired, after flying the kite D, the line 20 may be attached to the lower end of the line 18 before adding the extra length 19, after which attachment said extra length is added.

The method of this invention comprises first the flying of a kite to a suitable elevation, then attaching one end of an elongated aerial display device of a flexible nature to the end of the line leading from the kite, then paying out on the line through letting out the flexible display device, then attaching to the other end of the sign another line and paying out said line, flying another kite and attaching the end of the last named line to the line of the second kite, then attaching another line to the end of the last named line and letting out the line until both kites and sign are raised into position to display the sign. Through the method and apparatus of this invention, a single operator may conveniently and easily cause an aerial advertising display device to be maintained at an effective elevation for display purposes. The arrangement of the kites and rigging also the sign or display device, is such that the entire apparatus will be reliable and stable so as to maintain the sign in display position under varying weather conditions.

The net like support for the letters or advertising display offers little or no resistance to the wind and due to its construction and arrangement will maintain a position such that it will display the advertising matter to good advantage.

I claim:

1. The method of displaying aerial advertising matter which consists in flying to a suitable elevation a kite to which a line is attached, attaching to the end of the line a comparatively long flexible display device, paying out the line on the display device to elevate one end thereof by the consequent increase in the elevation of the kite, then flying another kite and attaching the line of the said kite to the other end of the elongated display device, then attaching another line to the ends of the last named lines and paying out the last named line until the display device is in substantially horizontal position between the lines of the two kites.

2. An aerial advertising apparatus comprising a flexible line, bars attached to and depending from said line, a flexible net work stitched between the bars and attached along its upper edge to said line, guide lines leading from the bars to ends of said lines, a kite having a line extending from it to one end of the first named line, another kite having a line attached to the other end of the first named line, which kites function to stretch the first named line and support the flexible net work in substantially horizontal position between the kite lines, display matter carried by the net work and a control line leading from the line of the second named kite to the ground, by which control line the entire apparatus may be let out or drawn in.

3. An aerial advertising apparatus comprising a flexible line, a flexible net work depending from the line, a kite having its line attached to one end of the first named line, another line attached to the end of the first named line, a kite having a line attached to the outer end of the last named line, said kites and lines functioning to support between the kite lines in substantially horizontal position the flexible net work, display matter attached to the flexible net work and a control line leading to the ground and attached to the joined ends of the line of the second named kite and to the line which is joined to said first named line.

4. An aerial advertising apparatus comprising a flexible line, a flexible net work depending from the line, a kite having its line attached to one end of the first named line, another line attached to the end of the first named line, a kite having a line attached to the outer end of the last named line, said kites and lines functioning to support between the kite lines in substantially horizontal position the flexible net work, display matter attached to the flexible net work and a control line leading to the ground and attached to the joined ends of the line of the second named kite and to the line which is joined to said first named line and another kite having a line attached to the control line at a point intermediate the ends of the latter.

5. The method of displaying aerial advertising matter which consists in flying to a suitable elevation a kite having a line attached thereto, attaching to the line of the kite a flexible comparatively long display device, paying out the display device to lift one end thereof by the constant increase of the elevation of the kite, then attaching another line to the lower end of the flexible display device and paying out said last named line, then flying another kite by means of a line and attaching the line of the last named kite to the last named line, then attaching a control line to the line of the second named kite and paying out the control line to elevate the entire apparatus.

6. The method of displaying aerial advertising matter which consists in flying to a suitable elevation a kite having a line attached thereto, attaching to the line of the kite a flexible comparatively long display device, paying out the display device to lift one end thereof by the constant increase of the elevation of the kite, then attaching another line to the lower end of the flexible display device and paying out said last named line, then flying another kite by means of a line and attaching the line of the last named kite to the last named line, then attaching a control line to the line of the second named kite and paying out the control line to elevate the entire apparatus, then flying another kite by means of a line and attaching the end of the last named kite line to the control line at a point intermediate the ends of the latter.

EDGAR G. FINLAY.